US006226671B1

(12) United States Patent
Hagersten et al.

(10) Patent No.: US 6,226,671 B1
(45) Date of Patent: May 1, 2001

(54) SHARED MEMORY SYSTEM FOR SYMMETRIC MULTIPROCESSOR SYSTEMS

(75) Inventors: Erik E. Hagersten, Palo Alto, CA (US); Mark D. Hill, Madison, WI (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/126,053

(22) Filed: Jul. 30, 1998

Related U.S. Application Data

(62) Division of application No. 08/674,688, filed on Jul. 2, 1996, now Pat. No. 5,862,357.

(51) Int. Cl.$^7$ .................................................. G06F 13/00
(52) U.S. Cl. ................................................................ 709/215
(58) Field of Search .............................. 711/1, 202, 147, 711/148, 153; 709/213, 214, 215, 216, 217

(56) References Cited

U.S. PATENT DOCUMENTS 5,117,350 * 5/1992 Parrish et al. ........................ 711/1

FOREIGN PATENT DOCUMENTS 0 387 644 A1   9/1990   (EP).
0 602 772 A1   6/1994   (EP).

OTHER PUBLICATIONS

Savo Savic et al., "Improved RMS for the PC Environment," XP 000590918, Microprocessors and Microsystems, vol. 19, No. 10, Dec. 1, 1995, pp. 609–619.

Lars Philipson, "A Communication for a Multiprocessor Computer with Distributed Global Memory," XP 000212269, 10$^{th}$ Annual Intl. Conf. On Computer Architecture, Jun. 13, 1983, pp. 334–340.

R. Jerome Folmar, "Distributed Memory Network: An 8 Gigabit Fiber Optic Tightly Coupled System," XP 000212288, Proceedings of IEEE 1985 National Aerospace and Electronics Conference Naecon 1985, May 20, 1985, pp. 91–94.

International Search Report for EP 97 30 4680 mailed on Jan. 11, 1999.

* cited by examiner

*Primary Examiner*—Robert B. Harrell
(74) *Attorney, Agent, or Firm*—Conley, Rose & Tayon, PC; B. Noël Kivlin

(57) ABSTRACT

A shared memory system for symmetric multiprocessing systems including a plurality of physical memory locations in which the locations are either allocated to one node of a plurality of processing nodes, equally distributed among the processing nodes, or unequally distributed among the processing nodes. The memory locations are configured to be accessed by the plurality of processing nodes by mapping all memory locations into a plurality of address partitions within a hierarchy bus. The memory locations are addressed by a plurality of address aliases within the bus while the properties of the address partitions are employed to control transaction access generated in the processing nodes to memory locations allocated locally and globally within the processing nodes.

19 Claims, 4 Drawing Sheets

SHARED MEMORY SYSTEM FOR SYMMETRIC MULTIPROCESSOR SYSTEMS

This is a divisional of U.S. application Ser. No. 08/674,688, filed Jul. 2, 1996, and now U.S. Pat. No. 5,862,357, entitled "Shared Memory System for Symmetric Microprocessor Systems", issued Jan. 19, 1999.

BACKGROUND OF THE INVENTION

1. Field of the Invention

The present invention is related to the field of symmetrical multiprocessing systems and, more particularly, to a symmetrical multiprocessing system including a hierarchical architecture.

2. Description of the Related Art

Multiprocessing computer systems include two or more processors which may be employed to perform computing tasks. A particular computing task may be performed upon one processor while other processors perform unrelated computing tasks. Alternatively, components of a particular computing task may be distributed among multiple processors to decrease the time required to perform the computing task as a whole. Generally speaking, a processor is a device configured to perform an operation upon one or more operands to produce a result. The operation is performed in response to an instruction executed by the processor.

A popular architecture in commercial multiprocessing computer systems is the symmetric multiprocessor (SMP) architecture. Typically, an SMP computer system comprises multiple processors connected through a cache hierarchy to a shared bus. Additionally connected to the bus is a memory, which is shared among the processors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the processors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches which are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. A bus is capable of a peak bandwidth (e.g. a number of bytes/second which may be transferred across the bus). As additional processors are attached to the bus, the bandwidth required to supply the processors with data and instructions may exceed the peak bus bandwidth. Since some processors are forced to wait for available bus bandwidth, performance of the computer system suffers when the bandwidth requirements of the processors exceeds available bus bandwidth.

Additionally, adding more processors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more processors are added.

These problems are further magnified by the continued increase in operating frequency and performance of processors. The increased performance enabled by the higher frequencies and more advanced processor microarchitectures results in higher bandwidth requirements than previous processor generations, even for the same number of processors. Therefore, buses which previously provided sufficient bandwidth for a multiprocessing computer system may be insufficient for a similar computer system employing the higher performance processors.

What is desired is a bus structure that supports the bandwidth requirements of a multiprocessor system with many high performance microprocessors and a relatively large physical distance separating the multiprocessors.

SUMMARY OF THE INVENTION

The problems outlined above are in large part solved by a hierarchical bus with a plurality of address partitions. Each physical memory location is mapped to multiple addresses. Therefore, each physical memory location can be accessed using a plurality of address aliases. The properties of each address partition are used by the hierarchical bus structure to determine which transaction are transmitted globally and which transactions are transmitted locally. In this manner, the hierarchical bus architecture eliminates global broadcasts of local transactions.

Broadly speaking, the present invention contemplates a multiprocessor architecture including a plurality of processing nodes, a plurality of low level buses, wherein each processing node is coupled to one of said plurality of low level buses, a plurality of repeaters, wherein each repeater is coupled to one of said low level buses, a top level bus and a system memory. The top level bus is connected to a plurality of repeaters and the repeaters control the transfer of data between the low level buses and the top level bus. The system memory includes a plurality of memory locations. Each of the processing nodes is configured to access all of the memory locations. The system memory locations map to a plurality of address partitions, whereby the system memory locations are addressed by a plurality of address aliases. Properties of the address partitions dictate the control of the transfer of data between the low level buses and the top level bus by the repeaters.

The present invention further contemplates a shared memory system including a plurality of memory locations, wherein the memory locations are allocated to one of a plurality of processing nodes. The memory locations are configured to be accessed by the plurality of processing nodes. The system memory locations map to a plurality of address partitions, whereby the system memory locations are addressed by a plurality of address aliases, and properties of the address partitions dictate which of the processing nodes have access to a data request.

The present invention still further contemplates a method for location specific data transfers on a hierarchical bus. The method includes the steps of: assigning a virtual address range to a process running on a node of said hierarchical bus, performing a data request to an address within said virtual address range, translating said virtual address to a physical address, and determining if said physical address is within a portion of memory designated as global or local. If the physical address is within a portion of memory designated as global, the memory is accessing using a global address. If the physical address is within a portion of memory designated local, determining that the physical address is within local memory. If the physical address is within local memory, accessing said physical address using a local address partition. If the physical address is not within local memory, trapping to the operating system. The operating system may rectify the trap in numerous manners. For example, data may be moved from the physical address to the local memory. Alternatively, the physical address may be remapped as a global address.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

A hierarchical bus includes a plurality of bus levels and nodes. A subset of the total number of nodes is connected to each of a plurality of low level busses. The low level busses are connected to one or more higher level busses via repeaters. The higher level busses are connected to even higher level busses via more repeaters. This concept naturally extends itself to as many levels of bus hierarchy as needed. At the highest stage, the repeaters are connected by a top level bus.

Figure 1:
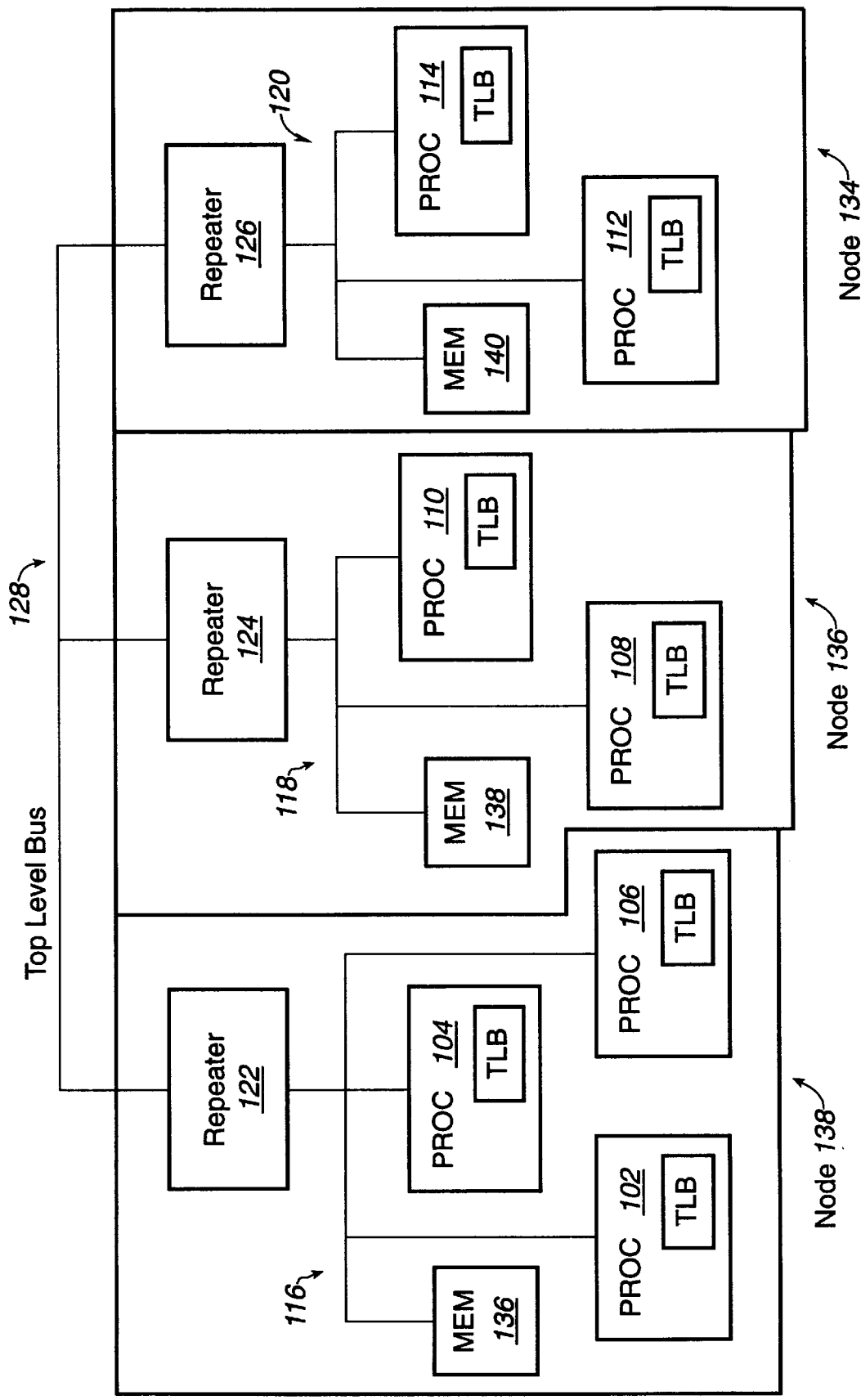
FIG. 1 is a block diagram of computer system that implements a hierarchical bus structure.

FIG. 1 illustrates a two level bus hierarchy. FIG. 1 includes nodes 138–134 and a top-level bus 128. Node 138 includes processors 102–106, low-level bus 116, memory 136, and repeater 122. Processors 102–106, repeater 122, and memory 136 are connected to low level bus 116. Processors 102–106 include a translation look-aside buffer (TLB). A TLB is a device that stores the most recently accessed virtual-to-physical address translations. Node 136 includes processors 108–110, low-level bus 118, repeater 124 and memory 138. Processors 108–110, memory 138 and repeater 124 are connected to low level bus 118. Processors 108–110 include a translation look-aside buffer (TLB). Node 134 includes processors 112–114, low-level bus 120, memory 140, and repeater 126. Processors 112–114, memory 140 and repeater 126 are connected to low level bus 120. Processors 112–114 include a translation look-aside buffer (TLB).

Transactions from each processor are driven on the low level bus and retransmitted by the repeaters via top level bus 128. The repeaters receiving a retransmitted transaction further retransmit the transaction on the attached low level bus, which is received by the attached processors. For example, processor 102 sends a transaction on low level bus 116. Repeater 122 retransmits the transaction to repeaters 124 and 126. Repeaters 124 and 126 receive the transaction via top level bus 128 and retransmits the transaction on low level busses 118 and 120. Processors 108–114 receive the transaction from low level busses 118 and 120.

In one embodiment, a local transaction between two devices in the same node (e.g. a processor and a memory) are not transmitted globally (i.e. to all nodes on the hierarchical bus). The global transmission of local transactions unnecessarily reduces data throughput of the bus. It is apparent that a local transaction could be defined differently than transactions between devices in the same node. For example, multiple nodes can be clustered together. A local transaction in this configuration would be any transaction between nodes in the same cluster of nodes. A global transaction would be a transaction between clusters of nodes. The cluster of nodes forms a "local domain" over which local transactions are broadcast, while the set of clusters forms a "global domain" over which global transactions are broadcast. For example, a point to point interconnect between the repeaters 122–126 and a top repeater (not shown) may be employed to transmit transactions to the top repeater. The top repeater may then determine which repeaters 122–126 receive the transaction based upon the local/global nature of the transaction.

By not broadcasting local transactions globally, transactions may complete in a more efficient manner than if these transactions were broadcast. The local transactions are dependent only upon responses from other processors within the "local domain", while global transactions are dependent upon all the processors within the computer system shown in FIG. 1. For example, the low-level buses 116–120 may employ snooping protocols for maintaining cache coherency. Broadcasting a transaction to a non-local low-level bus may involve a transaction upon high level bus 128, followed by a broadcast to low-level buses 115–120, followed by another high level bus 128 transaction to convey the snoop response to the initiating low-level bus. A local transaction, on the other hand, simply collects responses from the low-level bus(es) to which it is coupled. Furthermore, local transactions may be performed concurrently within the multiple local domains. In addition, bandwidth upon the high level bus 128 is conserved.

Figure 2:
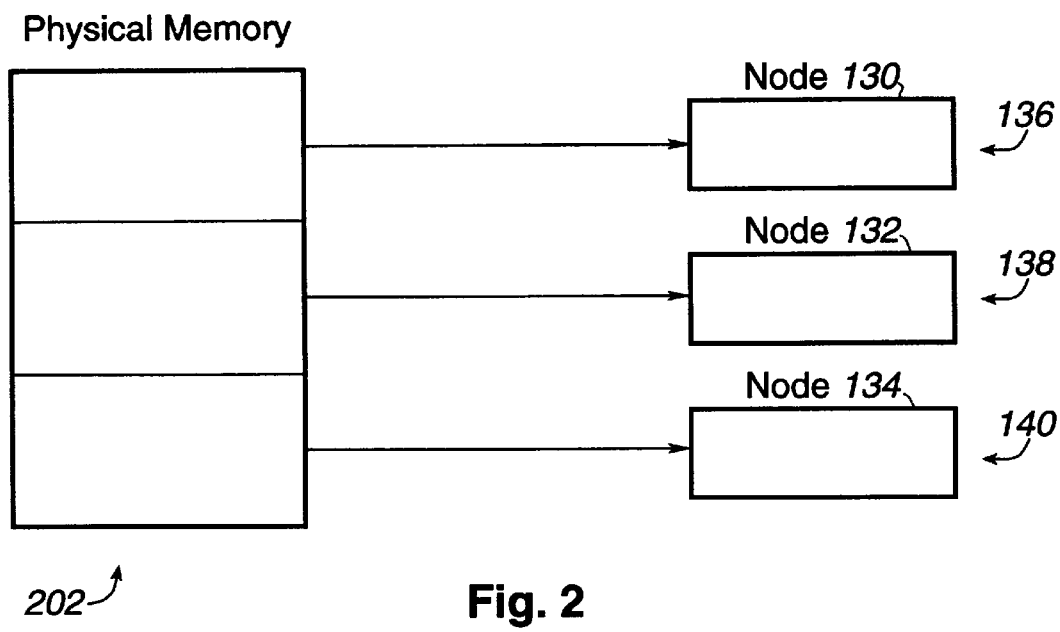
FIG. 2 illustrates the partitioning of physical memory among nodes of a hierarchical bus.

Turning now to FIG. 2, a diagram depicting allocation of the physical memory, or system memory, among the nodes of the multiprocessor system is shown. In one embodiment, the physical memory is equally divided among the processing nodes. Therefore, each of n processing nodes holds 1/n of the total physical memory locations. As illustrated in FIG. 2, in a three node multiprocessing system, physical memory 202 is divided into three local memories. Memory 136, one third of the physical memory, is allocated to node 130. Memory 138, also one third of physical memory 202, is allocated to node 132. Memory 140, is allocated to node 134. It is apparent that a multiprocessing system could allocate the memory in different proportions between the nodes. More particularly, node 130 may include a first amount of memory dissimilar from a second amount of memory in node 132 and a third amount of memory in node 134, etc.

Figure 3:
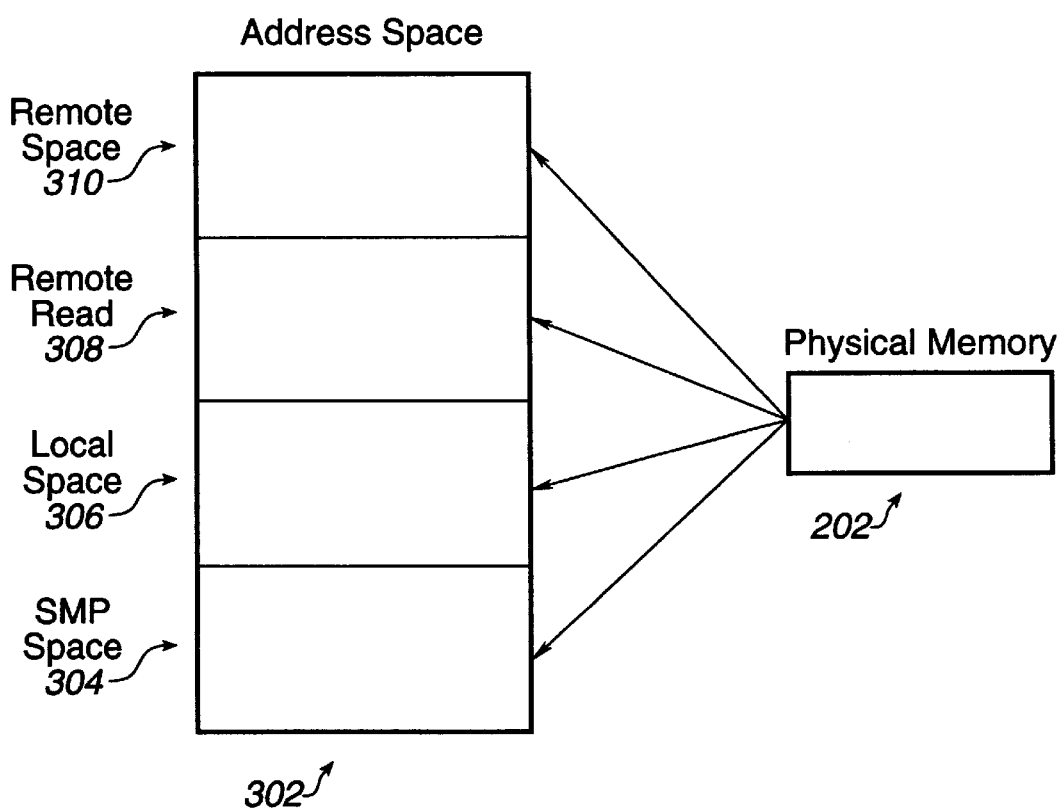
FIG. 3 illustrates a mapping of a physical memory to multiple address spaces.

Referring now to FIG. 3, each local memory (i.e., the memory allocated to a processing node) is mapped to multiple locations within address space 302. Address space 302 is comprised of multiple address partitions. Each physical memory location can be accessed using a plurality of address aliases (i.e., one from each partition). In one embodiment, address space 302 includes four address partitions: SMP-space 304 (SS), local-space 306 (LS), remote read space 308 (RR), and remote space 310 (RS). Each address partition is assigned properties which repeaters 122–126 use to control the transfer of data in the hierarchical bus structure.

The properties of each address partition are discussed in more detail below. SS 304 is the global address space, or global partition. Address aliases in this address partition are broadcast globally on the hierarchical bus. Therefore, accesses to a physical memory location not within the local address space of a node should use an SS address alias to access those memory locations. In addition, accesses to local memory space designated as global memory should use an SS address alias. Local memory may be designated as global memory if a process on a different node requires access to that memory.

Address partition LS 306 is the local address partition. Nodes may only use an address alias from LS 306 to access the portion of memory that is allocated to that node (i.e. local memory). Generally, the LS address partition may be used to access addresses within the local domain of the node, which may include other nodes. An access using an LS address alias to a physical memory location not to that node causes a trap when doing a page table walk or TLB access. The trap can be achieved if the system has a per-processor page table structure or a per-node page table structure. LS addresses are accorded a translation only in the page tables for the local node or local processors. Therefore, no translation exists in a remote processor's translation structure.

Address partition RR 308 is used to read data from remote addresses. In one embodiment, processes running on a node may use RR 308 to perform a read-stream transaction from a remote address. Read-stream is transaction performed in response to an instruction defined by the SPARC architecture to transfer data into the processor without caching the data. Similarly, address partition RS 310 is used to perform read-stream and write-stream instructions to remote memory. Write stream is an instruction defined by the SPARC architecture to transfer data from the processor without caching the data.

The address partitions are used to restrict and control the flow of data in a hierarchical bus computer system. The repeaters decide whether to broadcast a transaction to a higher level bus or to limit it to a low level based on the address partition of the transaction. For example, if node 138 attempted to address data stored in a memory location allocated to node 134, an SS address alias should be used to access the data. When repeater 122 receives a transaction with an SS address alias, it broadcasts the transaction on top level bus 128. In contrast, if node 138 attempts to access a memory location resident to node 138, which is not shared with other nodes, an LS address alias should be used. When repeater 122 receives an LS address alias, it does not broadcast the data on top level bus 128. Therefore, top level bus 128 and local busses 118 and 120 are free to perform other transactions. In this manner, the data throughput of the hierarchical bus is increased.

An issue arises when a process migrates from one node in the multiprocessor architecture to another node. Process migration occurs when a process originally assigned to one node is suspended and later reassigned to another node. Memory that was local to the process when originally assigned may no longer be a local. For example, if a process is originally assigned to node 130 and later reassigned to node 134, what was originally local memory to the process is now remote (i.e. allocated to a different node). The process, however, may not be aware that the memory location is no longer local. If the process attempts to access a memory location local to node 130 using an LS address alias, a trap will occur. The trap is caused by an attempt to translate a virtual address using the page table structure of the node into which the process is now assigned. The page table structure does not include translations which are for addresses in LS space within another node. A trap transfers control to the operating system. The operating system moves the data that was attempted to be accessed from node 130 to node 134 using RR 308 address aliases and local (LS) writes. The memory can then be accessed using an LS address alias. The use of a hierarchical affinity scheduler, which reduces the migration of processes from one node to another, can minimize the occurrence of moving data blocks from one node to another.

An alternative to copying the data from one node to another is to change the translation of the address from local to global. For example, the following process may be used:

(1) Invalidate the local translation in all local translation tables;
(2) Invalidate the translations in the TLBs (e.g. perform a TLB shootdown);
(3) Flush all cache lines within the page for all processors in the local node; and
(4) Create a new, global translation for the page.

Figure 4:
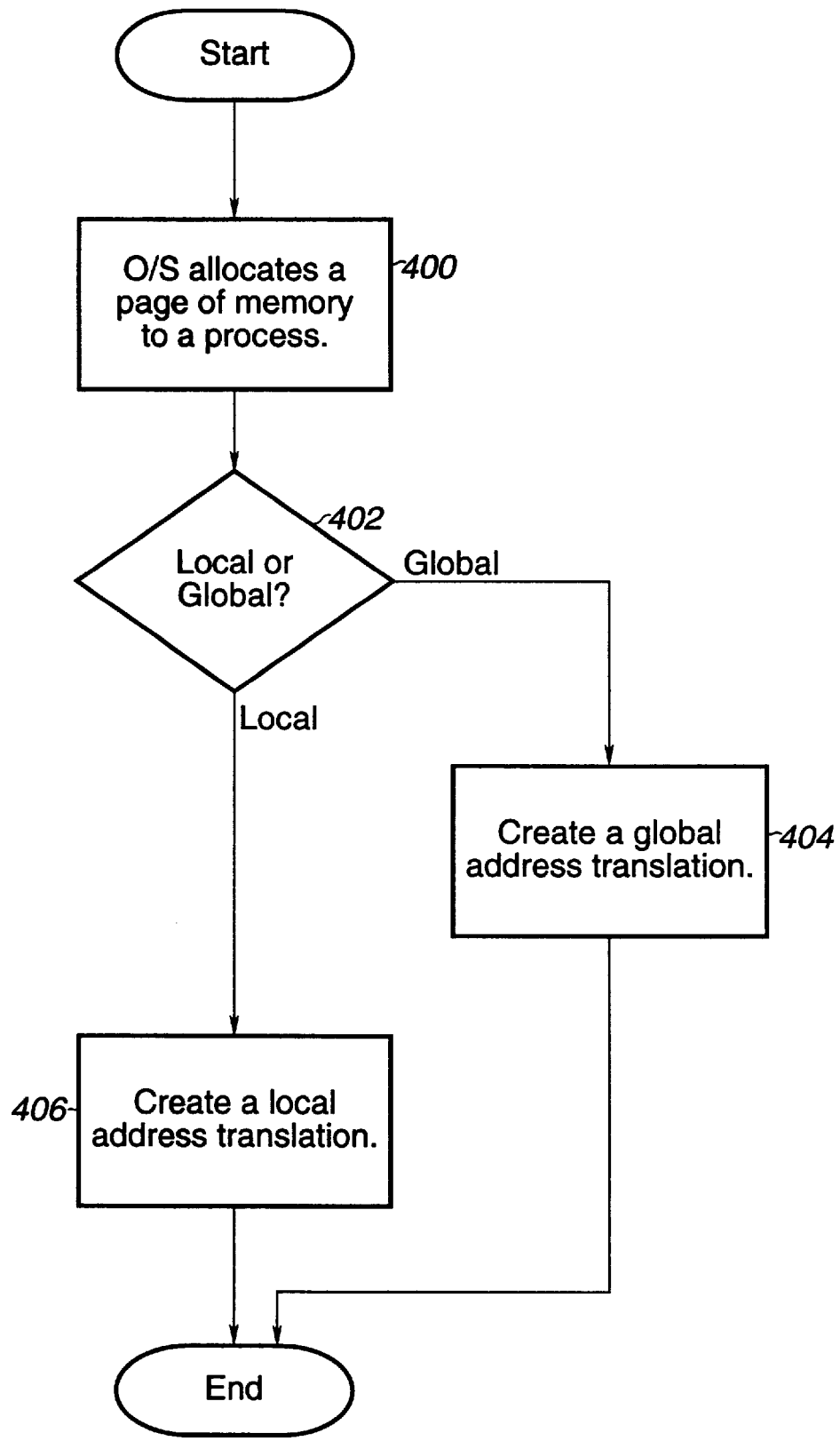
FIG. 4 is a flow diagram of the operation of an operating system in accordance with one embodiment of the present invention.

Turning next to FIG. 4, a flow diagram depicting a portion of the operation of an operating system in accordance with one embodiment of the present invention is shown. The portion shown in FIG. 4 depicts the activities performed when a page of memory is allocated to a process. A page may be allocated via an explicit request by the process being executed. Alternatively, a certain number of pages may be automatically allocated upon initiation of a process.

During a step 400, the operating system selects a page for allocation to the process. Generally, the operating system maintains a list of "free" pages (i.e. those pages which are not currently allocated to a process). One of the free pages is allocated to the process. If no pages are free, the operating system selects a currently allocated page, deallocates the page from the process to which it was allocated (including saving the data within the page to disk and invalidating the translation for the page), and allocates the page to the requesting process. Many algorithms are well known for selecting allocated pages for reallocation to a new process, generally known as demand-paged algorithms.

Upon selection of a page to allocate to the process, the operating system determines if the page should be allocated as local or global (step 402). A variety of algorithms may be used to select local versus global. As described in detail below, one scheme involves allocating pages as local initially, then changing the allocation to global upon occurrence of a trap during an attempt to access the page. Another scheme involves allocating pages as global initially, and later determining which pages to change to local based upon usage of the page by various nodes. It is noted that any suitable scheme may be employed.

If a page is determined to be global, then (as illustrated in a step 404) the operating system creates a global address translation (i.e. a translation to an address within SS space 304, RR space 308, or RS space 310). If the page table structure employed by the computer system is such that each processor or each node has its own page table structure, the translation is placed into all page table structures. Alternatively, the operating system may determine that the page should be local. As illustrated in a step 406, the operating system creates a local translation available only within the local domain. In the exemplary page table structure described above, the translation is placed only in the page table structure of the node containing the memory. If processors in other nodes attempt to access the address, no translation will be found in their page table structures and a trap will occur.

Figure 5:
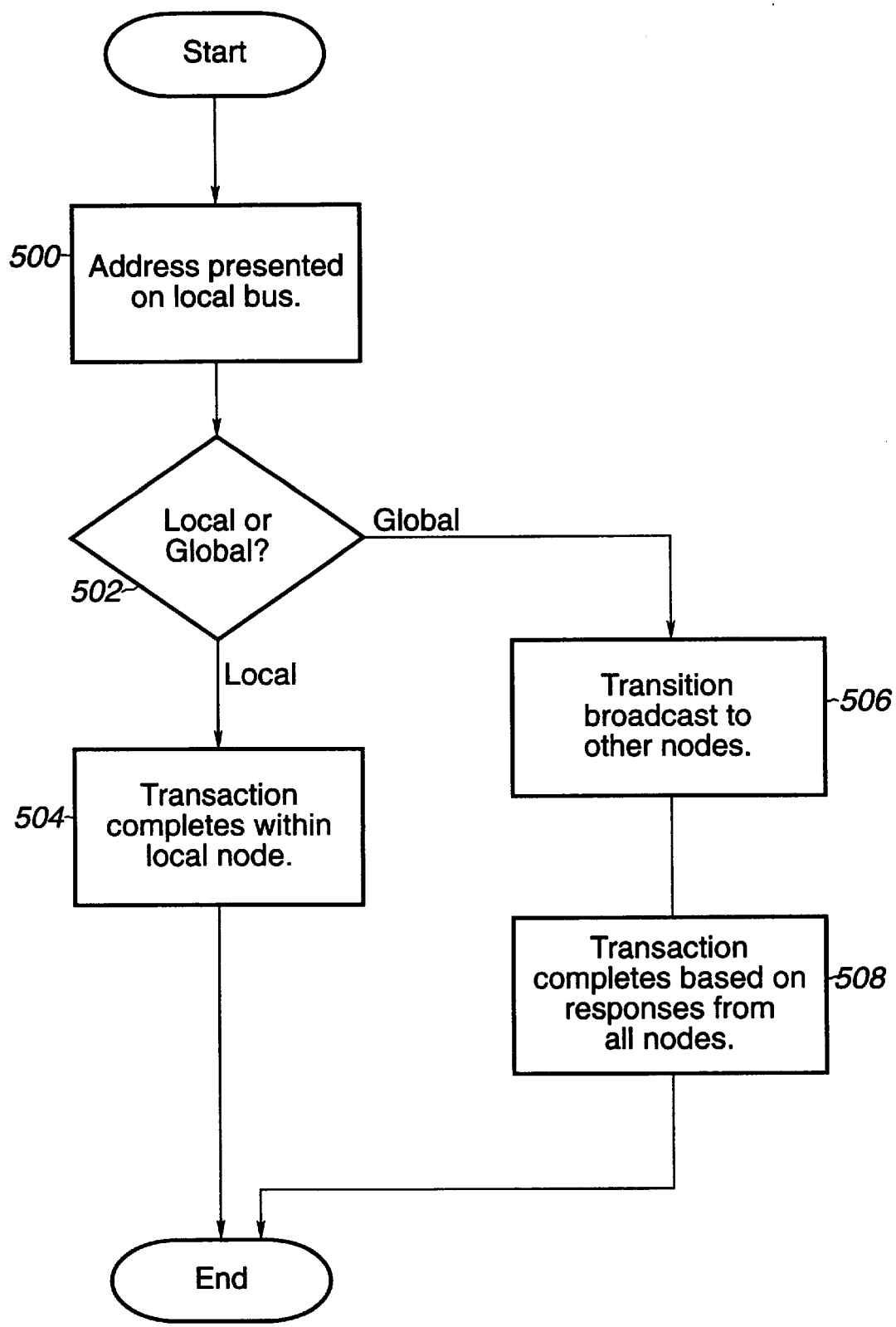
FIG. 5 is a flow diagram of the operation of a repeater in accordance with one embodiment of the present invention.

Turning next to FIG. 5, a flow diagram depicting operation of a repeater 122–126 in accordance with one embodiment of the present invention is shown. During a step 500, the repeater detects an address of a transaction being presented upon the corresponding low-level bus. As illustrated in step 502, the repeater determines if the address is local or global by determining which of the address partitions depicting in FIG. 3 contains the address.

If the address is within a local address partition (e.g. LS address partition 306 for the address space depicted in FIG. 3) then the repeater does not transmit the transaction to other repeaters. As illustrated in step 504, the transaction completes within the local node. Alternatively, the address may be within a global address partition (e.g. SS address partition 304, RR address partition 308, or RS address partition 310 for the address space depicted in FIG. 3). As illustrated in step 506, the repeater broadcasts the transactions to other nodes. The transaction subsequently completes based upon responses from all nodes, not just from the local node (step 508).

A hierarchical bus implementing the present invention has the potential for achieving higher throughput because accessing data using an LS address alias only causes local bus traffic. The hierarchical bus implements a true shared memory and potentially increases the data throughput of the system by several factors.

It is advantageous to modify the designation of memory as local or global. For example, if two processes are both accessing a page of data designated as local memory, that page is being moved from one node to another using RR address aliases each time a different process accesses it. In this case, it would be advantageous to designate that page of data as global. In addition, a page accessed by one process and only designated as global memory unnecessarily wastes bandwidth. Because the number of processes accessing a memory block changes, a method of dynamically changing the designation of memory blocks is desirable.

Several algorithms can be used for dynamically changing the designation of memory. In one embodiment, all pages of memory are originally designated as local and a counter keeps track of how many times a page is moved due to improper accesses using LS address aliases. When a threshold has been reached, the page is converted to global and no more block moves are required. In another embodiment each page is started off with a global designation. Pages are individually changed to local one at a time. Pages are then converted back to global using the algorithm discussed above. In yet another alternative, pages may be initially set to local and change to global as traps occur.

In one specific embodiment, address partitions are used to prevent a software bug in one node from corrupting data in another node. In this embodiment, only LS 306 and RR 308 address partitions are employed. This is performed by configuring the repeaters 122–124 such that only RR address aliases are broadcast. Each node runs its own kernel of the operating system. A kernel is a portion of the operating system encompassing a nucleus of the basic operating system functions. Each kernel is resident in the local memory of that node and is designated as local memory space. Therefore, nodes can only access the kernel of another node using read-only instructions. If a process on one node attempts to access the kernel of another node, the repeater will not broadcast the data request. The kernel can only be accessed from remote nodes using RR (read-only) address aliases. In this manner, a software bug running on one node cannot crash the kernel or any applications running on different nodes.

Any communications between nodes is performed in a poll based manner. Each node designates a memory location to store status bits indicating that the node has data for a process running on another node. The other processes periodically poll these status bits using RR address aliases, which are read only. When a process detects that another node has data for that process, the data is read using RR aliases. In this manner, data is transferred between nodes without any node having write access to another node. Therefore, corrupted software in one node is unable to write data to other nodes in the hierarchical bus, and corrupted software on one node is unable to corrupt software in other nodes. Alternatively, global interrupts may be supported between the processors instead of the poll-based scheme.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system comprising:
   a plurality of processing nodes;
   a hierarchical bus system comprising a plurality of address partitions; and
   a shared memory system comprising a plurality of physical memory locations wherein said plurality of physical memory location are either located in a node of said plurality of processing nodes, distributed in equal proportions among nodes of said plurality of processing nodes, or distributed in unequal proportions among at least two nodes of said plurality of processing nodes, wherein:
   said physical memory locations of said shared memory system are mapped to said plurality of address partitions of said hierarchy bus system, whereby each of said plurality of physical memory locations of said shared memory system are addressed by a plurality of address aliases, and wherein properties of said address partitions dictate whether a transaction in a transaction originating node of said plurality of nodes is visible to the remaining nodes of said plurality of nodes.

2. The computer system of claim 1 wherein said plurality of address partitions of said hierarchical bus system comprises: a symmetric multiprocessor (SMP) space, a local space, a remote read space, and a remote space.

3. The computer system of claim 2 wherein said physical memory locations are configured as a local memory and a global memory, wherein said local memory is adapted to store data local to a node of said processing nodes and global memory is adapted to store data global to said node of said processing nodes.

4. The computer system as recited in claim 3 wherein an access for data initiated in a first node of said plurality of processing nodes to either a local memory location of a second node of said plurality of processing nodes or a global memory location in said first node of said processing nodes is configured to use said address aliases included in said symmetric multiprocessor space, wherein said address aliases are broadcast globally on said hierarchy bus system.

5. The computer system as recited in claim 3 wherein an access for data initiated in a first node of said plurality of processing nodes to a local memory location of said first node of said processing nodes is configured to use said address aliases included in said local space, wherein said address aliases are broadcast locally within said first node.

6. The computer system as recited in claim 3 wherein an access to read data initiated in a first node of said plurality of processing nodes to a local memory location of a second node of said processing nodes is configured to use said address aliases included in said remote read space, wherein said address aliases are broadcast globally on said hierarchy bus system.

7. The computer system as recited in claim 3 wherein an access either to read or to write data initiated in a first node of said plurality of processing nodes to a local memory location of a second node of said processing nodes is configured to use said address aliases included in said remote space, wherein said address aliases are broadcast globally on said hierarchy bus system.

8. The computer system of claim 1, wherein said address partitions of said hierarchy bus system include:
   a global partition, wherein said transaction is visible to said remaining nodes; and
   a local partition, wherein said transaction is only visible to said transaction originating node.

9. The computer system of claim 8, wherein:
   said global partition is used by a first accessing node of said plurality of processing nodes to access a first portion of said physical memory locations addressed by said plurality of address aliases, wherein said portion of said physical memory locations are not allocated to said first accessing node of said processing nodes; and
   said local partition is used by a second accessing node of said plurality of processing nodes to access a second portion of said physical memory locations addressed by said plurality of address aliases, wherein said second portion of said physical memory locations are allocated to said second accessing node.

10. The computer system of claim 8, wherein if a node of said plurality of processing nodes attempts to use said local partition to access a first memory location addressed by said plurality of address aliases, wherein said first memory location is not allocated to said node, data stored in said first memory location is moved to a second memory location addressed by said plurality of address aliases, wherein said second memory location is allocated to said node.

11. A distributed shared memory system comprising:
   a physical memory including a plurality of distributed memory locations, wherein said distributed memory locations are distributed among a plurality of nodes, said distributed memory locations are configured to be accessible by any node of said plurality of nodes, and said plurality of nodes are connected through a shared bus;
   wherein:
      said distributed memory locations of said physical memory are mapped to a plurality of address partitions, whereby each of said distributed memory locations are addressed by a plurality of address aliases, and wherein properties of said address partitions dictate whether a transaction in a transaction originating node of said plurality of nodes is visible to the remaining nodes of said plurality of nodes.

12. The distributed shared memory system of claim 11, wherein said address partitions include:
   a global partition, wherein said transaction is visible to said remaining nodes; and
   a local partition, wherein said transaction is only visible to said transaction originating node.

13. The distributed shared memory system of claim 12, wherein:
   said global partition is used by a first accessing node of said plurality of nodes to access a first portion of said distributed memory locations addressed by said plurality of address aliases, wherein said first portion of said distributed memory locations are not allocated to said first accessing node; and
   said local partition is used by a second accessing node of said plurality of nodes to access a second portion of said distributed memory locations addressed by said plurality of address aliases, wherein said second portion of said distributed memory locations are allocated to said second accessing node.

14. The distributed shared memory system of claim 12, wherein if a node of said plurality of nodes attempts to use said local partition to access a first distributed memory location addressed by said plurality of address aliases, wherein said first distributed memory location is not allocated to said node, data stored in said first distributed location is moved to a second distributed memory location addressed by said plurality of address aliases, wherein said second distributed memory location is allocated to said node.

15. The distributed shared memory system of claim 11 wherein said distributed memory locations are distributed in either an equal or unequal proportion among said plurality of nodes.

16. A shared memory system comprising:
   a physical memory including a plurality of memory locations, wherein said memory locations are allocated to a first node of a plurality of nodes, and said memory locations are configured to be accessed by said plurality of nodes;
   wherein:
      said physical memory locations are mapped to a plurality of address partitions, whereby each of said physical memory locations are addressed by a plurality of address aliases, and wherein properties of said address partitions dictate whether a transaction in a transaction originating node of said plurality of nodes is visible to the remaining nodes of said plurality of nodes.

17. The shared memory system of claim 16, wherein said address partitions include:
   a global partition, wherein said transaction is visible to said remaining nodes; and
   a local partition, wherein said transaction is only visible to said transaction originating node.

18. The shared memory system of claim 17, wherein:
   said global partition is used by a first accessing node of said plurality of said nodes to access a first plurality of physical memory locations of said physical memory locations addressed by said plurality of address aliases, wherein said first plurality of physical memory locations are not allocated to said first accessing node; and
   said local partition is used by a second accessing node of said plurality of said nodes to access said physical memory locations addressed by said plurality of address aliases, wherein said physical memory locations are allocated to said second accessing node.

19. The shared memory system of claim 16, wherein if a node of said plurality of said nodes attempts to use said local partition to access a first memory location addressed by said plurality of address aliases, wherein said first memory location is not allocated to said node, data stored in said memory location is moved to a second memory location addressed by said plurality of address aliases, wherein said second memory location is allocated to said node.

* * * * *